United States Patent [19]

Wrightson et al.

[11] 4,347,018
[45] Aug. 31, 1982

[54] LINING OR RELINING OF TUNNELS

[75] Inventors: Noel T. Wrightson, Rugby; Russell D. Currie, Shrewsbury, both of England

[73] Assignees: Johnston Construction Limited; Johnston Pipes Limited, both of Redhill, England

[21] Appl. No.: 175,681

[22] Filed: Aug. 5, 1980

[30] Foreign Application Priority Data

Aug. 9, 1979 [GB] United Kingdom ............... 7927764

[51] Int. Cl.³ .................... E21D 11/00; F16L 55/18; B23P 19/04
[52] U.S. Cl. .................... 405/150; 138/97; 29/451; 29/460
[58] Field of Search .................... 405/146, 150–153; 29/234, 235, 451, 460; 138/141, 143, 151, 157, 97, 98; 264/269

[56] References Cited

U.S. PATENT DOCUMENTS

| | | | |
|---|---|---|---|
| 3,406,724 | 10/1968 | Carlstrom et al. | 138/141 X |
| 3,878,320 | 4/1975 | Mixon, Jr. et al. | 29/235 X |
| 3,894,328 | 7/1975 | Jansson | 29/451 |
| 4,109,684 | 8/1978 | Fernandez | 138/97 |
| 4,170,248 | 10/1979 | Bennett et al. | 138/97 |
| 4,207,130 | 6/1980 | Barber | 29/451 X |

*Primary Examiner*—David H. Corbin
*Assistant Examiner*—Nancy J. Pistel
*Attorney, Agent, or Firm*—Young & Thompson

[57] ABSTRACT

A method of lining or relining a tunnel comprises the steps of deforming a collar for insertion into the tunnel, reforming the collar to locate it in the tunnel, overlapping the edges of a pipe having a single longitudinal split to reduce its cross-sectional area for insertion into the tunnel, re-aligning the edges and expanding the pipe in the tunnel for engagement with the sleeve, and securing the edges together to retain the pipe in its expanded form.

6 Claims, 4 Drawing Figures

U.S. Patent  Aug. 31, 1982  4,347,018
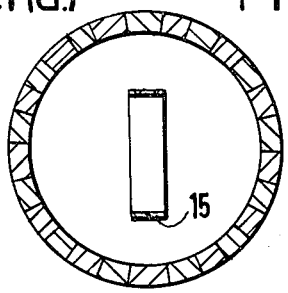
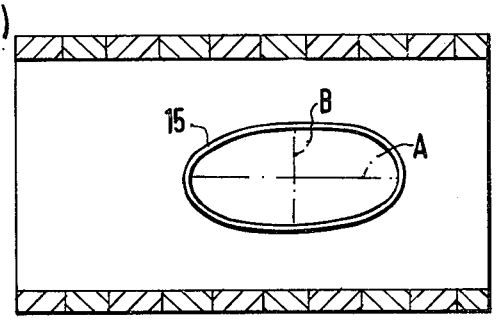
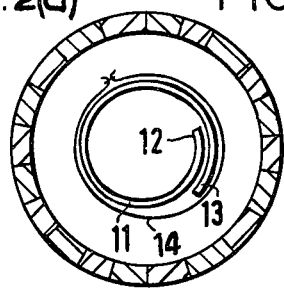
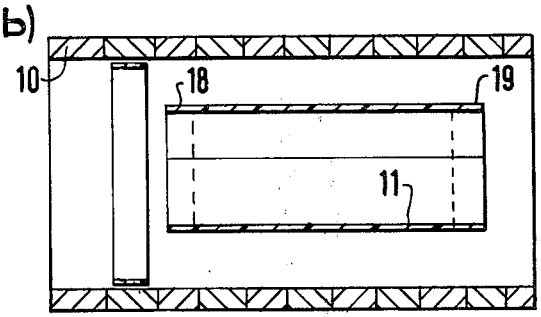
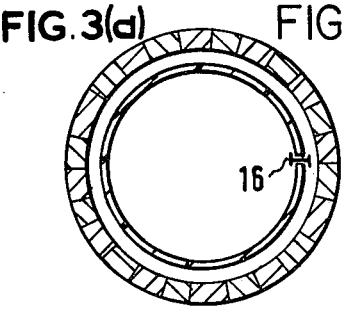
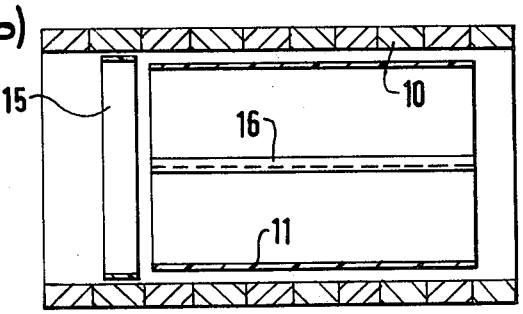
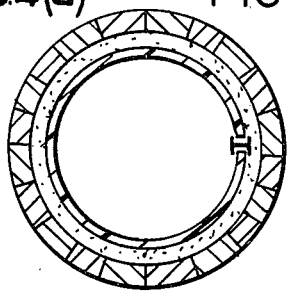
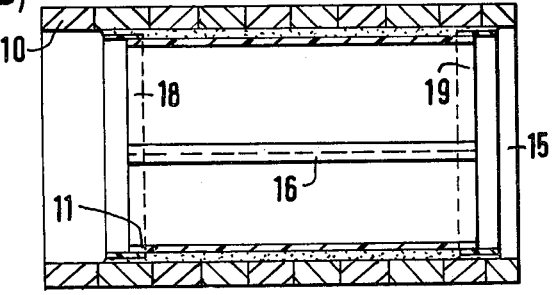

LINING OR RELINING OF TUNNELS

The invention relates to the lining or relining of tunnels and is particularly, but not exclusively, concerned with a method of relining sewers. The term "tunnel" throughout this specification is intended to include any tunnel, conduit, duct or the like.

The invention provides a method of lining or relining a tunnel, for example a sewer, comprising the steps of overlapping the edges of a pipe including a single longitudinal split in order to reduce the cross-sectional periphery of the pipe, the pipe being of a material of sufficient pliability to permit the overlapping of its edges without fracture, inserting the pipe with overlapped edges into the tunnel, re-aligning the edges of the pipe and thereby expanding the pipe in the tunnel, and securing the edges of the pipe together to retain the pipe in its expanded form.

Preferably the pipe edges are secured together by inserting between the edges an elongate member of H cross-section. Preferably the method includes the further steps of deforming a collar into a shape in which a first dimension of the collar is increased and a second dimension is decreased, inserting the deformed collar into the tunnel with its said first dimension generally along the tunnel, expanding the collar back to its original shape, rotating the collar about an axis generally transverse of the tunnel to locate the collar in the tunnel and engaging the pipe with the collar when expanding the pipe in the tunnel.

The method may further comprise the step of grouting the space between the pipe and the tunnel wall after the pipe edges are secured together.

The pipe may be of glass-reinforced plastics material and may be secured with its edges overlapping, for example by straps, prior to insertion into the tunnel.

Further features and advantages of the invention will become apparent from the following description, by way of example, of a preferred method of relining sewers according to the invention, the description being read with reference to the accompanying drawings in which:

FIG. 1a is an end view of a sewer tunnel showing a step in the method;

FIG. 1b is a section through the tunnel showing the same step as in FIG. 1a; and FIGS. 2a to 4b are views similar to FIGS. 1a and 1b showing subsequent steps in the method.

A large number of sewers, particularly in old industrial areas, have deteriorated due to overloading, chemical decay and old age. These sewers require to be relined.

Referring now to the drawings, a method of relining such sewer tunnels 10 will be described.

The main relining material is lengths of pipe 11 which include a single longitudinal slit along their length. The purpose of the slit is to allow the edges 12, 13 of the pipe adjacent the slit to be overlapped (as shown in FIG. 2) so that the pipe is partly rolled up in order to reduce its cross-sectional periphery. The pipe 11 may be of any suitable material which is pliable enough to enable the edges 12, 13 to be overlapped but is preferably of a glass reinforced plastics material for example a glass reinforced polyester pipe such as the ARMAFLO pipe (ARMAFLO is a registered trade mark of Johnston Pipes Limited).

Other materials used in the relining method are a collar 15 (FIG. 1a) which is a short tube of a pliable material which may be the same material as the pipe 11 and a jointing member 16 which is an elongate member of H cross-section. The jointing member 16 may be of any non-corrosive material, for example plastics or stainless steel.

The method of relining the sewer tunnel 10 is as follows. Sections of pipe 11 are first partly rolled up by overlapping their edges 12, 13 as shown in FIG. 2 and then retained in this partly rolled-up state by straps 14 or other suitable restraining means. The pipes 11 may be manufactured with the longitudinal slit but are preferably manufactured as complete circular section pipes which are subsequently cut longitudinally.

A collar 15 is distorted to the oval shape shown in FIG. 1 so that it has a major dimension A and a minor dimension B and the collar 15 is retained in this distorted state by a strap or other restraining means (not shown). The collar 15 is then inserted into the tunnel 10 as shown in FIG. 1 with the major dimension of the collar generally aligned with the axis of the tunnel so that the collar will readily pass into the tunnel. When the collar 15 is at the desired position, the strap or other restraining means is released so that the collar returns to its normal circular shape and the collar is then rotated through 90° about an axis transverse of the tunnel 10 so that the collar is positioned co-axially with the tunnel.

A section of pipe 11 is then inserted into the tunnel as shown in FIGS. 2a and 2b and is brought into position adjacent the collar 15 which has already been positioned. The straps or other restraining means holding the pipe 11 in its partly rolled-up state are then released and the pipe is expanded to its original state with the edges 12, 13 aligned and with one end portion 18 adjacent to the collar 15.

The section of pipe 11 is then retained in its state with the edges 12, 13 aligned by inserting a jointing member 16 between the said edges, preferably by sliding the jointing member into the gap between edges 12, 13 from one end of the section of pipe 11. The pipe end 18 is then inserted into the collar 15 as shown in FIG. 4b.

Next, a second collar 15' is brought into the tunnel in a similar fashion to the collar 15 as shown in FIG. 1a and 1b and is located on the other end 19 of the pipe 11.

Finally, the generally annular space between the pipe 11 and the wall of the tunnel 10 is filled with a grouting mixture of known type. Further sections of pipe 11 and collars 15 are then added by repeating the steps described above to reline the tunnel 10.

It will be appreciated that the method of relining sewers described above has several advantageous points. The method involves a simple and practical installation of the relining; it is very much more economic than full replacement of the original tunnel lining; the glass reinforced plastics pipes employed provide structural strength to the relining; the relining is water tight; and by appropriate selection of the size of pipe 11, the relining method is applicable to a wide range of sizes of existing sewers and will restrict the flow capacity of the relined sewer as little as possible by being as close to the original size as possible and by providing a smooth bore after relining.

It will further be appreciated that the invention is not limited to the preferred embodiment described above and various modifications may be made to the method. For example, if the pipe sections 11 and collars 15 are a sufficiently close fit in the tunnel 10 the grouting step may be dispensed with.

Furthermore, the joint between edges 12, 13 of pipe sections 11 may be achieved other than by using jointing members 16. For example, the edges 12, 13 might be riveted together.

Still further, the method may be used to line non-circular tunnels, for example oval tunnels in which case the pipes and collars will be correspondingly non-circular.

Although the term "tunnel" has been used to describe the sewers being relined, this term is intended to include any conduit, bore, tunnel, culvert or the like.

It will still further be appreciated that the method described above may be used for lining as well as relining tunnels.

We claim:

1. A method of lining or relining a tunnel, for example a sewer, comprising the steps of overlapping the edges of a pipe including a single longitudinal split in order to reduce the cross-sectional periphery of the pipe, the pipe being of a material of sufficient pliability to permit the overlapping of its edges without fracture, inserting the pipe with overlapped edges into the tunnel, re-aligning the edges of the pipe and thereby expanding the pipe in the tunnel, securing the edges of the pipe together to retain the pipe in its expanded form, deforming a collar into a shape in which a first dimension of the collar is increased and a second dimension is decreased, inserting the deformed collar into the tunnel with its said first dimension generally along the tunnel, expanding the collar back to its original shape, rotating the collar about an axis generally transverse of the tunnel to locate the collar in the tunnel and engaging the pipe with the collar when expanding the pipe in the tunnel.

2. A method of lining or relining a tunnel as claimed in claim 1 wherein the step of securing the edges of the pipe together comprises the step of inserting between said edges an elongate member of H cross-section.

3. A method of lining or relining a tunnel as claimed in claim 1, in which the pipe is surrounded by a wall of the tunnel that is spaced from the pipe, further comprising the step of grouting the space between the pipe and the tunnel wall after the pipe edges are secured together.

4. A method of lining or relining a tunnel as claimed in claim 1 wherein the pipe is of glass-reinforced plastics material.

5. A method of lining or relining a tunnel as claimed in claim 1 wherein the pipe is secured with its edges overlapping prior to insertion into the tunnel.

6. A tunnel lined or relined by a method as claimed in claim 1.

* * * * *